United States Patent
Uzkent et al.

(10) Patent No.: US 12,468,944 B2
(45) Date of Patent: Nov. 11, 2025

(54) METHOD AND SYSTEM FOR LEARNING TO SHARE WEIGHTS ACROSS TRANSFORMER BACKBONES IN VISION AND LANGUAGE TASKS

(71) Applicant: SAMSUNG ELECTRONICS CO., LTD., Suwon-si (KR)

(72) Inventors: Burak Uzkent, Mountain View, CA (US); Vasili Ramanishka, Mountain View, CA (US); Yilin Shen, Santa Clara, CA (US); Hongxia Jin, San Jose, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 685 days.

(21) Appl. No.: 17/940,709

(22) Filed: Sep. 8, 2022

(65) Prior Publication Data
US 2023/0289590 A1 Sep. 14, 2023

Related U.S. Application Data (60) Provisional application No. 63/319,732, filed on Mar. 14, 2022.

(51) Int. Cl.
| | | |
|---|---|---|
| G06N 3/08 | (2023.01) | |
| G06N 3/063 | (2023.01) | |
| G10L 15/26 | (2006.01) | |
| G10L 25/54 | (2013.01) | |

(52) U.S. Cl.
CPC ............ *G06N 3/08* (2013.01); *G06N 3/063* (2013.01); *G10L 15/26* (2013.01); *G10L 25/54* (2013.01)

(58) Field of Classification Search
None
See application file for complete search history.

(56) References Cited

U.S. PATENT DOCUMENTS

| | | | | |
|---|---|---|---|---|
| 12,314,865 B2 * | 5/2025 | Clement | ............... | G06F 8/20 |
| 2022/0076127 A1 * | 3/2022 | Wagner | ............... | G06N 3/082 |

FOREIGN PATENT DOCUMENTS

| | | |
|---|---|---|
| CN | 113806609 A | 12/2021 |
| CN | 114117101 A | 3/2022 |
| CN | 114298158 A | 4/2022 |

OTHER PUBLICATIONS

Sangho Lee et al., Parameter Efficient Multimodel Transformers for Video Representation Learning, arXiv:2012.04124v2, Sep. 22, 2021 (Year: 2021).*

Zhu, et al., "ActBERT: Learning Global-Local Video-Text Representations", 2020, CVPR, 10 pages total.

(Continued)

*Primary Examiner* — Dov Popovici
(74) *Attorney, Agent, or Firm* — Sughrue Mion, PLLC (57) ABSTRACT

A method of training a model includes configuring a first transformer for visual learning with a first set of weights, configuring a second transformer for textual learning with a second set of weights, adjusting at least the second set of weights based on minimizing a weight difference between the first set of weights and the second set of weights, replacing the first set of weights for the first transformer with the adjusted second set of weights, and updating the first transformer based on the adjusted second set of weights.

20 Claims, 5 Drawing Sheets

(56) References Cited

OTHER PUBLICATIONS

Ruan, et al., "Survey: Transformer based Video-Language Pre-training", 2021, Elsevier, 16 pages total, arXiv:2109.09920v1.

Communication dated Jun. 1, 2023, issued by the International Searching Authority in counterpart International Application No. PCT/KR2023/002565 (PCT/ISA/210).

Communication dated Jun. 1, 2023, issued by the International Searching Authority in counterpart International Application No. PCT/KR2023/002565 (PCT/ISA/237).

Lee et al., "Parameter Efficient Multimodal Transformers for Video Representation Learning," arXiv:2012.04124v2 [cs.CV], Sep. 2021, 18 pages total.

Akbari et al., "VATT: Transformers for Multimodal Self-Supervised Learning from Raw Video, Audio and Text," arXiv:2104.11178v3 [cs.CV], Dec. 2021, 21 pages total.

Lin et al., "M6-10T: a Sharing-Delinking Paradigm for Efficient Multi-Trillion Parameter Pretraining," arXiv:2110.03888v3 [cs.LG], Oct. 2021, 15 pages total.

\* cited by examiner

METHOD AND SYSTEM FOR LEARNING TO SHARE WEIGHTS ACROSS TRANSFORMER BACKBONES IN VISION AND LANGUAGE TASKS

CROSS-REFERENCE TO RELATED APPLICATION(S)

This application is based on and claims priority under 35 U.S.C. § 119 to U.S. Provisional Application No. 63/319,732, filed on Mar. 14, 2022, in the U.S. Patent and Trademark Office, the disclosure of which is incorporated herein by reference in its entirety.

BACKGROUND

1. Field

The disclosure relates generally to systems and methods that utilize transformers for processing data with different modalities.

2. Description of Related Art

Transformers have been popular for processing data with different modalities. As a result, transformers may be utilized to process data with different modalities to perform multimodal tasks. However, transformers may contain a large number of parameters, which can be prohibitive when deploying the transformers on real-world applications that utilize mobile devices. Thus, there is a need to reduce the number of parameters and sizes of the transformers to be able to deploy the transformers on such devices.

SUMMARY

According to an aspect of the disclosure, a method of training a model may include configuring a first transformer for visual learning with a first set of weights, configuring a second transformer for textual learning with a second set of weights, adjusting at least the second set of weights based on minimizing a weight difference between the first set of weights and the second set of weights, replacing the first set of weights for the first transformer with the adjusted second set of weights, and updating the first transformer based on the adjusted second set of weights.

According to an aspect of the disclosure, a method of performing image processing by a neural network model may include obtaining a video and a text query for searching an object in the video, inputting the video to a vision transformer of the neural network model, inputting the text query to a text transformer of the neural network model, and identifying the object from the video based on an output of the neural network model. The neural network model may be trained such that a second set of weights of the text transformer is adjusted based on minimizing a weight difference between a first set of weights of the vision transformer and the second set of weights of the text transformer, the first set of weights of the vision transformer is replaced with the adjusted second set of weights, and the vision transformer is updated based on the adjusted second set of weights.

According to an aspect of the disclosure, a system for training a model may include a memory storing instructions, and a processor configured to execute the instructions to configure a first transformer for visual learning with a first set of weights, configure a second transformer for textual learning with a second set of weights, adjust at least the second set of weights based on minimizing a weight difference between the first set of weights and the second set of weights, replace the first set of weights for the first transformer with the adjusted second set of weights, and update the first transformer based on the adjusted second set of weights.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

Figure 1:
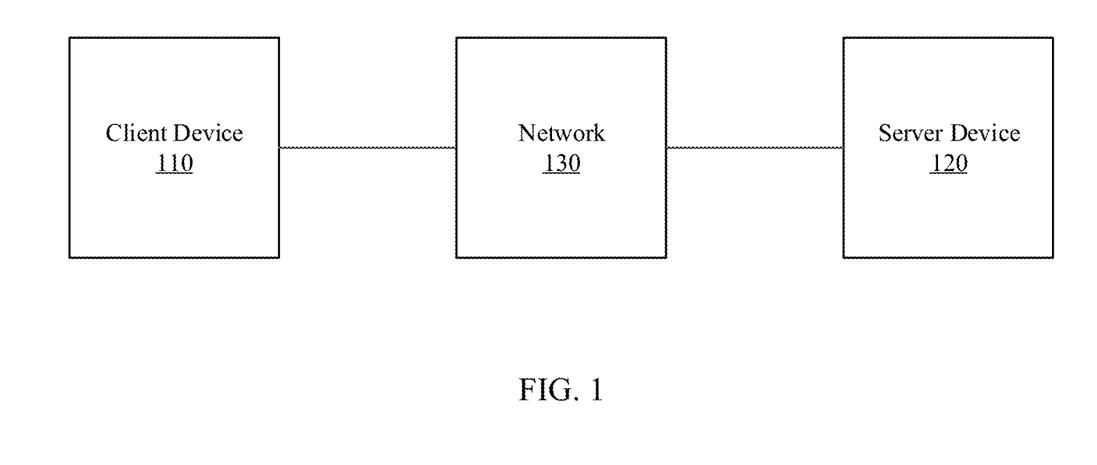
FIG. 1 is a diagram of devices of a system according to an embodiment.

FIG. 1 is a diagram of a system according to an embodiment. FIG. 1 includes a client device 110, a server device 120, and a network 130. The client device 110 and the server device 120 may interconnect via through the network 130 providing wired connections, wireless connections, or a combination of wired and wireless connections.

The client device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device, according to embodiments.

The server device 120 may include one or more devices. For example, the server device 120 may be a server device, a computing device, or the like which includes hardware such as processors and memories, software modules and a combination thereof to perform corresponding functions.

The network 130 may include one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
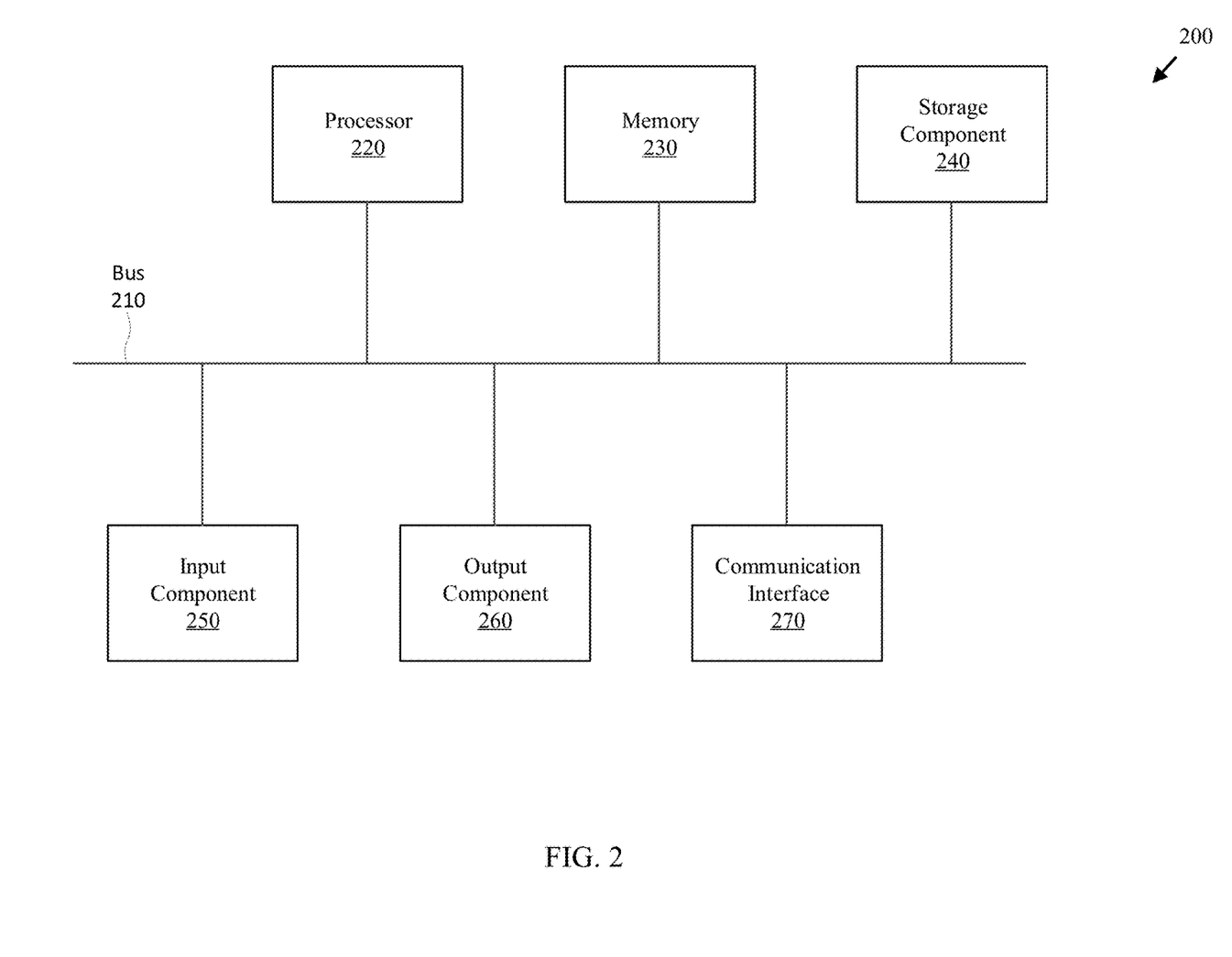
FIG. 2 is a diagram of components of the devices of FIG. 1 according to an embodiment.

FIG. 2 is a diagram of components of one or more devices of FIG. 1 according to an embodiment. Device 200 shown in FIG. 2 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 may include a component that permits communication among the components of the device 200. The processor 220 may be implemented in hardware, software, firmware, or a combination thereof. The processor 220 may be implemented by one or more of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and another type of processing component. The processor 220 may include one or more processors capable of being programmed to perform a corresponding function.

The memory 230 may include a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 may store information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 may include a component that permits the device 200 to receive information, such as via user input (e.g., a touch screen display, a keyboard, a keypad, a mouse, a button, a switch, and/or a microphone). The input component 250 may also include a sensor for sensing information (e.g., a global positioning system (GPS) component, an accelerometer, a gyroscope, and/or an actuator).

The output component 260 may include a component that provides output information from the device 200 (e.g., a display, a speaker, and/or one or more light-emitting diodes (LEDs)).

The communication interface 270 may include a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored in a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Transformers have seen growing interest on processing different modalities, such as language and images. As a result, vision and language data may be processed using transformers that are architecturally similar. In one embodiment, a weight is shared between two architecturally similar transformers for vision and language tasks. More specifically, two main components of the transformers, multi-head attention (MSA), and feed-forward network (FFN) layers, may be shared across two backbones. To achieve this, an additional objective may be used to encourage the minimization of the difference of the MSA weights as well as the FFN weights across two backbones. After minimizing the corresponding weights in two backbones, weight sharing may be performed and the model may be fine-tuned.

Some vision and language models have shown improvement over existing models on different vision and language tasks mainly because of the large-scale end-to-end object detection-based pre-training and large model size with more than 150 million parameters. However, the large number of parameters in vision and language models render their application on resource-limited real-world platforms impractical. For this reason, reducing the number of parameters may improve real-world vision and language applications (e.g., Visual Question Answering (VQA) and Referring Expression Comprehension (REC)).

To reduce model size, methods such as knowledge distillation, pruning, quantization and weight sharing may be used. However, these methods are commonly designed to compress models with single backbones on vision or language only tasks, and compressed models are later utilized for vision and language tasks. For this reason, there exists a lack of a model size reduction method that benefits from two architecturally similar vision and language transformers on vision and language tasks.

Provided are systems, methods and devices for training a model, and the training may include configuring a first transformer for visual learning with a first set of weights, configuring a second transformer for textual learning with a second set of weights, adjusting at least the second set of weights based on minimizing a weight difference between the first set of weights and the second set of weights, replacing the first set of weights for the first transformer with the adjusted second set of weights, and fine-tuning the first transformer based on the adjusted second set of weights, Further provided are systems, methods and devices of performing image processing by a neural network model, and the image processing may include obtaining a video and a text query for searching an object in the video, inputting the video to a vision transformer of the neural network model, inputting the text query to a text transformer of the neural network model and identifying the object from the video based on an output of the neural network model. The neural network model may be trained such that a second set of weights of the text transformer is adjusted based on minimizing a weight difference between a first set of weights of the vision transformer and the second set of weights of the text transformer, the first set of weights of the vision transformer is replaced with the adjusted second set of weights, and the vision transformer is fine-tuned based on the adjusted second set of weights.

As is described below, the systems, methods and devices may implement partial/full weight sharing across two transformer backbones. The system may use two identical transformers for vision and language data to learn visual and language representations. In this direction, the system may replace the convolutional neural network (CNN) in the architecture of related art with a vision transformer that has an identical structure to the text transformer. Furthermore, the system may incorporate a learning objective that encourages a difference of the corresponding weights in two transformers to be small while optimizing for task accuracy. More specifically, the system may minimize the weight difference across different transformers MSA and FFN layers' weights on pre-training step while optimizing for pre-training task-specific objective. After the pre-training step, the system may remove the vision transformer's MSA and FFN weights and replace them with text transformer's MSA and FFN weights (or vice versa) and fine-tune the model on the target task with respect to a task-specific objective. The system allows for partial or full weight sharing, providing a trade-off between the number of shared parameters and accuracy.

Figure 3:
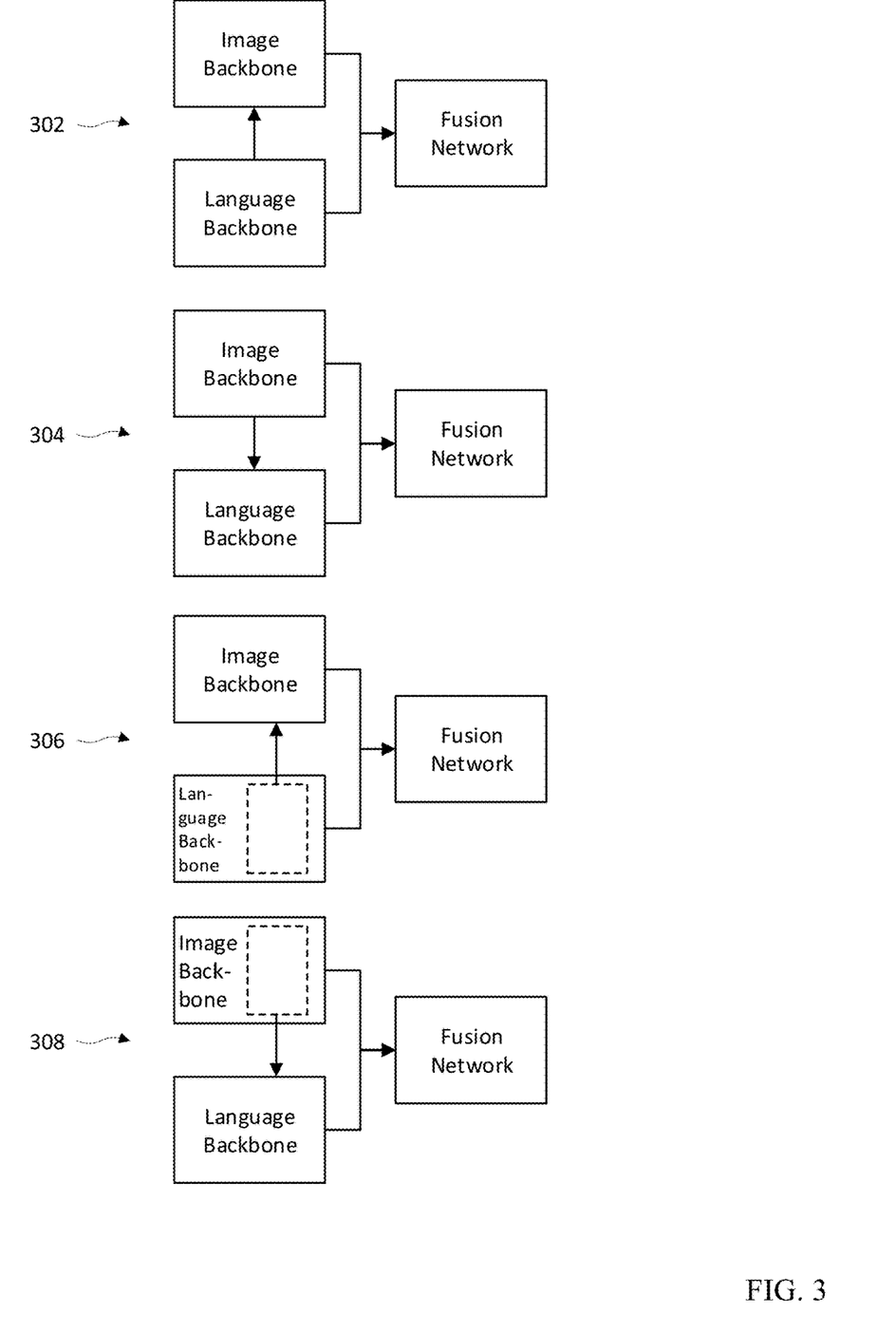
FIG. 3 is a diagram of weight sharing between image and language backbones, according to an embodiment.

FIG. 3 is a diagram of weight sharing between image (e.g., vision) and language (e.g., text) backbones, according to an embodiment. As shown in FIG. 3, in operation 302, the language backbone is shared with the image backbone. In operation 304, the image backbone is shared with the language backbone. In operation 306, the language backbone is partially shared with the image backbone. In operation 308, the image backbone is partially shared with the language backbone.

In one embodiment, weight sharing is performed across two identical components of two different backbones for vision and language tasks. The backbones may be shared fully or partially as shown in the FIG. 3. In another embodiment, a vision and language model may utilize at least two architecturally different backbones, a CNN for processing images, a first transformer for processing language data, and a second transformer to process learned vision and language representations. Sharing weights across a CNN and transformer backbone is non-trivial due to their highly different architectures. Accordingly, two architecturally similar transformers may be used to process image and text data. In one example, a vision transformer is used to process images in a vision and language model.

Using two similar transformer backbones, a learning objective that encourages the corresponding weights across two backbones to have similar magnitude may be used. More specifically, MSA and FFN layers at the same depth and head in two backbones may be used for weight sharing. The MSA and FFN layers may have the same structure in two backbones. This learning objective may be incorporated on the multimodal pre-training step, and jointly optimized for language conditioned bounding box detection accuracy and the minimal difference between weights on two backbones. After pre-training, the corresponding weights in the two backbones may be shared and the model may be fine-tuned with shared weights on target vision and language tasks, including VQA and REC.

In one embodiment, a vision and language model may include a vision encoder $f_v$ and text encoder $f_t$ parameterized by $\theta_v$ and $\theta_t$ that outputs representations $z_v$ and $z_t$ as in Equation (1) and (2):

$$z_v = f_v(x_v; \theta_v) \quad (1)$$

$$z_t = f_t(x_t; \theta_t) \quad (2)$$

The multimodal representations may be then concatenated and passed to a third-stage fusion network, $f_m$, parameterized by $\theta_m$ as in Equation (3):

$$s = f_m([z_v, z_t]; \theta_m) \quad (3)$$

where s represents task-specific predictions. For example, for REC, s may be a single bounding box prediction, whereas for VQA, s may be class predictions where the classes represent answers to a question. Given this multimodal network with parameter list $\theta = [\theta_v, \theta_t, \theta_m]$, the goal is to share weights between two backbones with parameters $\theta_v$ and $\theta_t$.

For the text backbone, in one embodiment, a multimodal network may be used. A language transformer may be used to process language data. The text transformer may first project raw language data to word embeddings and then sum them with the positional embedding formulated as in Equation (4):

$$z_t = e_t(x_t) + p_t(x_t) \quad (4)$$

where $e_t$ and $p_t$ represent word and positional embedding functions.

Next, the transformer may process the input embeddings $z_t$ by 12 encoders where each encoder includes MSA, layer norm (LN), Gaussian Error Linear Unit (GELU), and FFN layers. In high-level, the operations in an encoder may be represented as in Equations (5) and (6).

$$a_t = LN_t(MSA_t(z_t)) + z_t, \quad (5)$$

$$z_t = LN_t(FFN_t(a_t)) + a_t. \quad (6)$$

Regarding the vision backbone, the vision encoder may be parameterized to learn image representations. Since transformers have been successfully applied to vision, language, and other modalities, a CNN encoder may be replaced with a vision transformer. This way, weight sharing may be performed across the vision and text encoders. In the vision encoder transformer, there may be a convolutional layer, $e_v$, to divide image into patches and learn patch representations. Patch embedding may then be then summed with the positional embedding, $e_v$. This operation is represented as in Equation (7).

$$z_v = e_v(x_v) + p_v(x_v) \quad (7)$$

Next, the vision transformer may process the input embedding $z_v$ by 12 encoders where each encoder includes MSA, LN, GELU, and FFN operations similar to text transformer encoder. The operations in a vision transformer encoder are represented as in Equations (8) and (9).

$$a_v = LN_v(MSA_v(z_v)) + z_v \quad (8)$$

$$z_v = LN_v(FFN_v(a_v)) + a_v. \quad (9)$$

Regarding the multimodal transformer, after learning the modality-specific representations from two transformer backbones, the concatenated representations $[z_t, z_v]$ may be passed to another transformer. For referring expression comprehension task, the bounding box predictions with the highest confidence score may be selected. In one embodiment, for VQA, bounding boxes are not output. Instead, class probabilities may be output for different answers. A different number of encoders and decoders may be used on the input representations. In one embodiment, a same structure is kept for the multimodal transformer.

In the multi-head self-attention layer, linear projection weights may be learned to obtain $Q, \mathcal{K}, \mathcal{V}$ matrices given input tokens z containing N vectors represented as $z \in \mathbb{R}^{N \times D}$. These linear projections may be represented as in Equation (10):

$$Q = W_Q z, \quad \mathcal{K} = W_K z, \quad \mathcal{V} = W_V z \quad (10)$$

where $Q \in \mathbb{R}^{N \times d}$ represents N number of d dimensional query vectors, $\mathcal{K} \in \mathbb{R}^{k \times d}$ represents k number of key vectors, and $\mathcal{V} \in \mathbb{R}^{k \times d}$ represents k number of value vectors. On the other hand, $W_Q$, $W_K$, and $W_V$ represent the weights for generating $Q$, $\mathcal{K}$, and $\mathcal{V}$. The goal is to share the weights $W_Q$, $W_K$, and $W_V$ in two transformer backbones to reduce model size, as shown in Equation (11):

$$\text{Attention}(Q, \mathcal{K}, \mathcal{V}) = \text{Softmax}(Q, \mathcal{K}^T / \sqrt{d}) \mathcal{V} \quad (11)$$

where query vector $q \in Q$ is compared to each key vector $k \in \mathcal{K}$ using inner product operation. Next, the attention scores are normalized by a factor of $\sqrt{d}$. Finally, each attention score is multiplied by their corresponding value vector $v \in \mathcal{V}$ and obtained k number of d-dimensional attention vectors are summed to get the output of a single attention head for a single input token. This is performed for N number of tokens to produce an output matrix of size N×d. The operations may represent a single attention head. On the other hand, an MSA may involve multi-head attention, where the same operations are performed at H number of heads in parallel. Outputs from each attention head are then concatenated to produce an output matrix of size N×Hd. Then, using a linear layer with weights $W_H$, N×Hd-dimensional matrix is projected into $a \in \mathbb{R}^{N \times D}$. $W_H$ is used for sharing weights in addition to $W_Q$, $W_K$, and $W_V$.

Finally, LN and skip connections are performed, as in Equation (12).

$$a = \text{Norm}(a) + z \quad (12)$$

To account for different attention heads, index j is introduced, and to account for attention layers at different depths, index i is introduced. In one embodiment, weights for an attention head j, and encoder block i are represented as $$Q_{Q_i^j}, W_{K_i^j}, W_{V_i^j}.$$

In one embodiment, the re-projection weights are represented as $W_{H_i}$. Additionally, since there are two transformer backbones, weights for attention head j at depth i for vision transformer are represented as $$W_{Q_i^j}^v, W_{K_i^j}^v, W_{V_i^j}^v$$

and as $$W_{Q_i^j}^t, W_{K_i^j}^t, W_{V_i^j}^t$$

for text transformer. For vision and text transformer re-projection weights, $W_{H_i}^v$ and $W_{H_i}^t$ may be used.

Given the notations for MSA layer weights for two different transformer backbones, the objective for weight sharing across MSA layers is represented as in Equations (13), (14), (15), and (16):

$$L_a^q = \sum_{i=1}^{B} \sum_{j=0}^{H} \left\| W_{Q_i^j}^v - W_{Q_i^j}^t \right\|_1 \quad (13)$$

$$L_a^k = \sum_{i=1}^{B} \sum_{j=0}^{H} \left\| W_{K_i^j}^v - W_{K_i^j}^t \right\|_1 \quad (14)$$

$$L_a^v = \sum_{i=1}^{B} \sum_{j=0}^{H} \left\| W_{V_i^j}^v - W_{V_i^j}^t \right\|_1 \quad (15)$$

$$L_a^h = \sum_{i=1}^{B} \left\| W_{H_i}^v - W_{H_i}^t \right\|_1 \quad (16)$$

where $L_a^q$, $L_a^k$, $L_a^v$, and $L_a^h$ represent the losses for query, key, value and reprojection weights, where B and H represent the number of encoder blocks in transformer and number of attention-heads in an MSA layer. Finally, the losses are linearly combined to obtain a final weight sharing loss for an MSA layer as in Equation (17).

$$a = \text{Norm}(a) + z \quad (17)$$

The goal is to minimize the difference between the weights across two backbones at the same encoder block i and the same attention-head level j. In one embodiment, weight sharing may not be performed for LN for two reasons. First, they have a small number of parameters (~1,000), and second, to allow backbones to have their norm weights.

In one embodiment, weight sharing may be performed for the FFN layer across two transformer backbones. The operations in the FFN layer involve two linear layers separated by an activation function (e.g., GELU). Assuming that the output of the MSA layer is represented by $a \in \mathbb{R}^{N \times D}$ in the first linear layer, a is expanded followed by an activation function and a compression layer as in Equation (18):

$$z = \text{Norm}(W_C \sigma(W_E a) + a) \quad (18)$$

where $W_E$ represents the expansion layer weights and $\sigma$ = GELU. In the second part of the FFN, the expanded vectors are compressed back to its original size where $W_C$ represents the compression weights. The output $z \in \mathbb{R}^{N \times D}$ is passed to the MSA layer in the next encoder.

Similar to the MSA layers, the index i is used for the encoder block of the FFN layer in a transformer. For the vision transformer, the weights are represented as $W_{E_i}^v$ and $W_{C_i}^v$, and for the text transformer, the weights are represented as $W_{E_i}^t$ and $W_{C_i}^t$.

Given the notations for FFN layers for two different transformer backbones, the objective for weight sharing across expansion and compression layers in FFN is represented as in Equations (19) and (20).

$$L_f^e = \sum_{i=1}^{B} \|W_{E_i}^v - W_{E_i}^t\|_1 \quad (19)$$

$$L_f^c = \sum_{i=1}^{B} \|W_{C_i}^v - W_{C_i}^t\|_1 \quad (20)$$

The losses may be linearly combined to obtain final weight sharing loss for the full FFN as in Equation (21).

$$L_f = L_f^e + L_f^c \quad (21)$$

In one embodiment, the objective of minimizing the L1 difference between MSA weights and FFN weights across two transformers is combined with the task-specific objective of performing joint learning on a multimodal dataset. Three training steps may be performed for the proposed multimodal network. First, the system may perform pre-training for two transformer backbones on their modality-specific tasks. Second, the system may perform pre-training for the whole model including two transformer backbones on multimodal pre-training dataset on language conditioned object detection. Third, the system may perform fine-tuning for the whole model on the downstream task (e.g., referring expression comprehension or VQA). In one embodiment, the difference of corresponding weights in two transformers backbone is reduced at the second step. Therefore, the objective for the multimodal pre-training step (the second step) is updated to, as in Equation (22):

$$L_{pretrain} = L_{task} + L_a + L_f \quad (22)$$

where $L_{task}$ represents the bounding box detection loss for all the objects mentioned in a language query.

After reduce the L1 difference between corresponding MSA and FFN weights across two backbones, the MSA and FFN weights are shared and fine-tuning is performed to fine-tune the whole network with shared weights on downstream task (e.g., referring expression comprehension or VQA). The weights may be shared in different ways. In one embodiment, the MSA and FFN weights of the text transformer are used for the MSA and FFN weights of the vision transformer formulated as in Equations (23) and (24).

$$W_{Q_i^j}^v = W_{Q_i^j}^t, W_{K_i^j}^v = W_{K_i^j}^t, W_{V_i^j}^v = W_{V_i^j}^t, W_{H_i}^v = W_{H_i}^t, \quad (23)$$

$$W_{E_i}^v = W_{E_i}^t, W_{C_i}^v = W_{C_i}^t \quad (24)$$

In another embodiment, the MSA and FFN weights of the vision transformer are used for the MSA and FFN weights of the text transformer, as in Equations (25) and (26).

$$W_{Q_i^j}^t = W_{Q_i^j}^v, W_{K_i^j}^t = W_{K_i^j}^v, W_{V_i^j}^t = W_{V_i^j}^v, W_{H_i}^t = W_{H_i}^v, \quad (23)$$

$$W_{E_i}^t = W_{E_i}^v, W_{C_i}^t = W_{C_i}^v \quad (24)$$

Figure 4A:
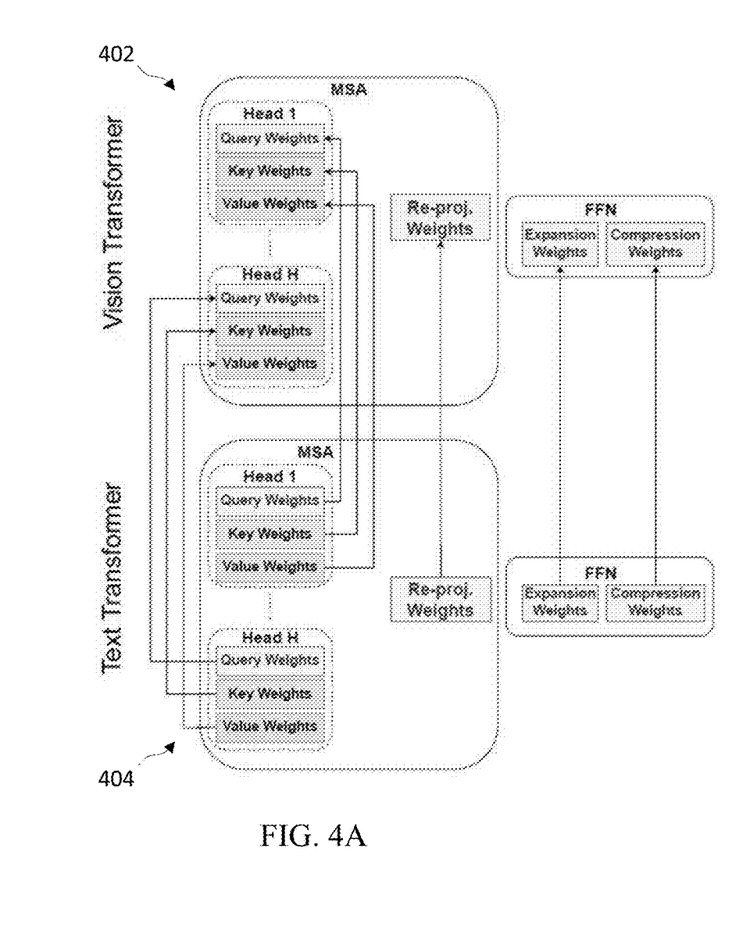
FIGS. 4A and 4B are diagrams of systems utilizing weight sharing, according to an embodiment.
Figure 4B:
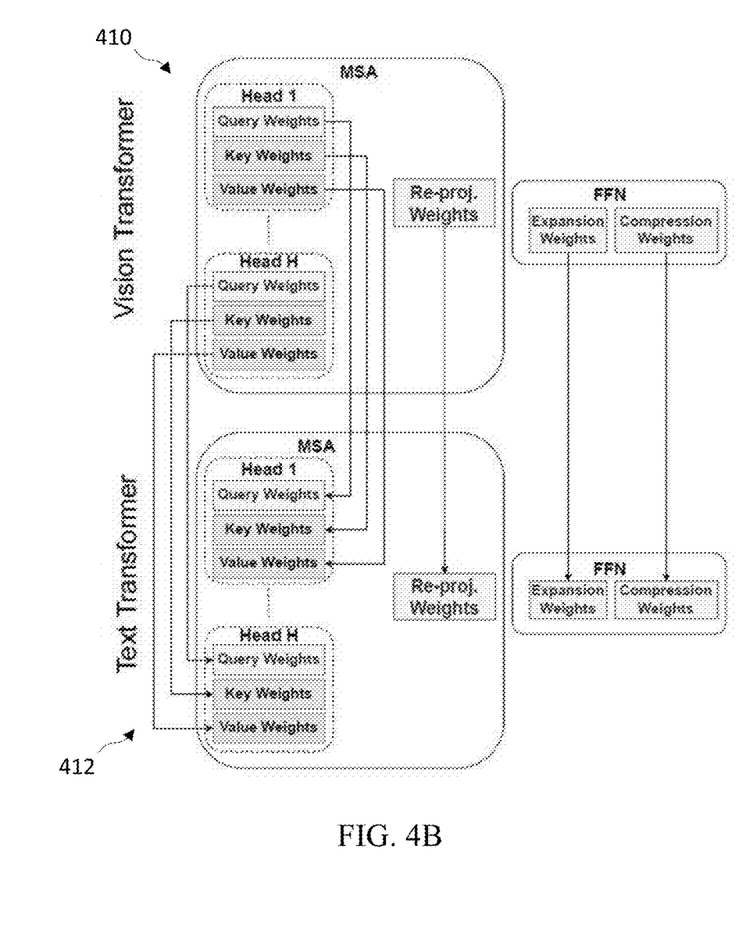

FIGS. 4A and 4B are diagrams of systems utilizing weight sharing, according to an embodiment. In FIG. 4A, the system includes a vision transformer 402 and a text transformer 404, and the MSA and FFN weights are shared by the text transformer 404 with the vision transformer 402. In FIG. 4B, the system includes a vision transformer 410 and a text transformer 412, and the MSA and FFM weights are shared by the vision transformer 410 with the text transformer 412. For simplicity, the MSA and FFN blocks are illustrated for one encoder. However, in some embodiments, there may be additional encoders in the backbones. As a result, the MSA and FFN weights are shared in each one of the encoders separately across two backbones.

In one embodiment, the weights across the MSA and FFN layers may be shared without optimizing for the weight difference objective. However, the difference between the weights across two transformers may be large and directly sharing the weights may lead to a performance drop. In another embodiment, the system may use only one transformer backbone to process both the text and image data, although the performance may decrease.

The systems, methods and devices disclosed herein may be utilized for multimodal tasks for on-device operation on mobile devices, and may completely remove the parameters required by one of the two transformers. As a result, it becomes easier to deploy them on real-world resource-limited platforms. The systems, methods and devices disclosed herein may be utilized for detecting an object in an image based on a language query, that is, referring expression comprehension tasks (e.g., showing related products based on detecting the object corresponding to the language query). The systems, methods and devices disclosed herein may also be utilized for augmented reality (AR) applications to determine an object referred to by a language query. The systems, methods, and devices disclosed herein may be utilized for audio-vision related tasks, such as text-based audio suppression.

Figure 5:
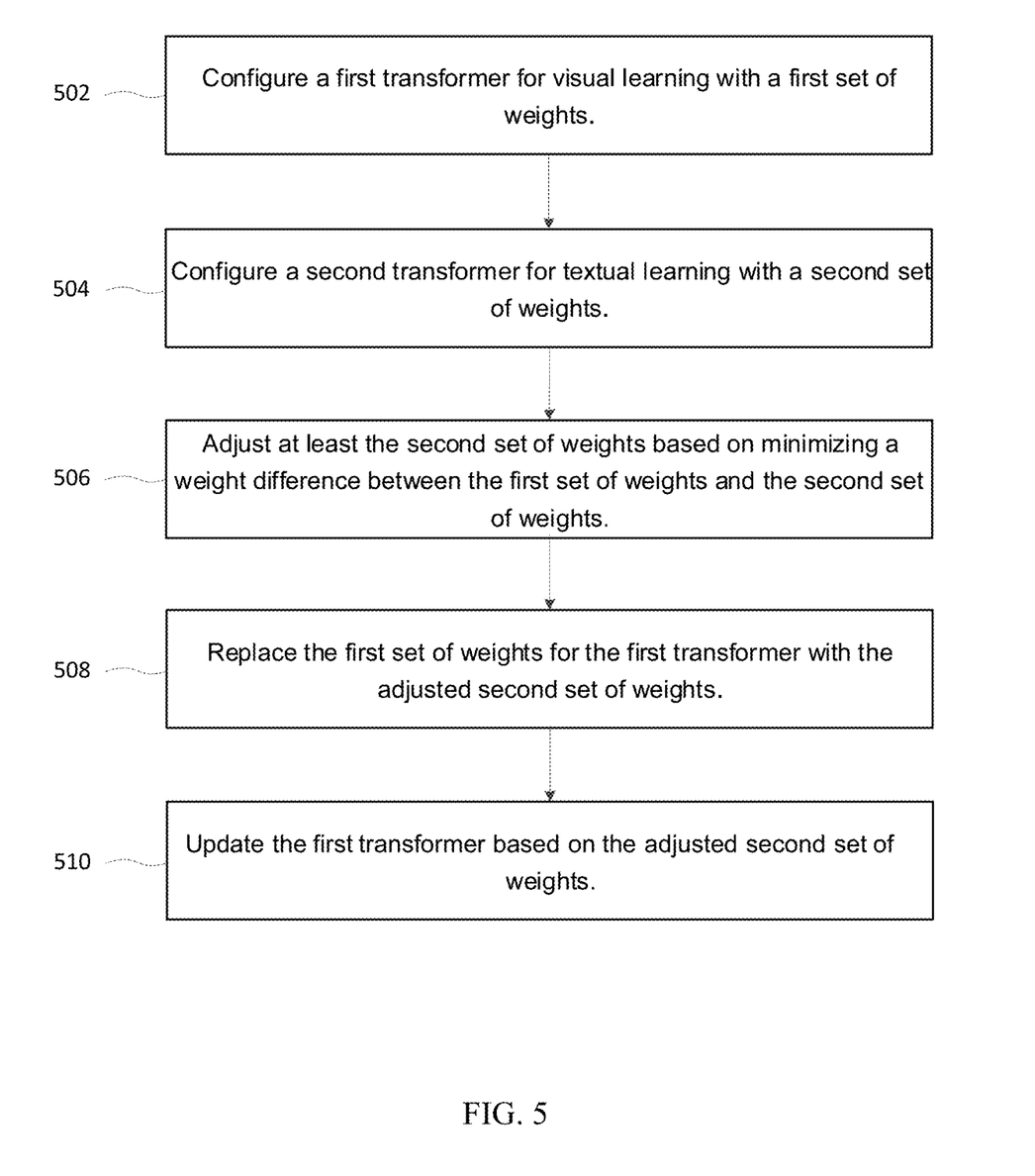
FIG. 5 is a flowchart of a method of training a model, according to an embodiment.

FIG. 5 is a flowchart of a method of training a model, according to an embodiment. In operation 502, the system may configure a first transformer for visual learning with a first set of weights. In operation 504, the system may configure a second transformer for textual learning with a second set of weights. In operation 506, the system may adjust at least the second set of weights based on minimizing a weight difference between the first set of weights and the second set of weights. In operation 508, the system may replace the first set of weights for the first transformer with the adjusted second set of weights. In operation 510, the system may update (e.g., fine-tune) the first transformer based on the adjusted second set of weights.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like The flowchart and block diagrams in the drawings illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of training a model, the method comprising:
   configuring a first transformer for visual learning with a first set of weights;
   configuring a second transformer for textual learning with a second set of weights;
   adjusting at least the second set of weights based on minimizing a weight difference between the first set of weights and the second set of weights;
   replacing the first set of weights for the first transformer with the adjusted second set of weights; and
   updating the first transformer based on the adjusted second set of weights.

2. The method of claim 1, wherein the first transformer and the second transformer comprise an identical architecture.

3. The method of claim 1, wherein the first transformer comprises a first multi-head self-attention (MSA) layer, and wherein the second transformer comprises a second MSA layer.

4. The method of claim 3, wherein the first set of weights comprises at least one of a first query weight, a first key weight, a first value weight, and a first projection weight, and
   wherein the second set of weights comprises at least one of a second query weight, a second key weight, a second value weight, and a second projection weight.

5. The method of claim 1, wherein the first transformer comprises a first feed forward network (FFN) layer, and
   wherein the second transformer comprises a second FFN layer.

6. The method of claim 5, wherein the first set of weights comprises at least one of a first expansion weight and a first compression weight, and
   wherein the second set of weights comprises at least one of a second expansion weight and a second compression weight.

7. The method of claim 1, wherein adjusting at least the second set of weights comprises:
   generating a multi-head self-attention (MSA) loss based on a difference between the first set of weights and the second set of weights that correspond to MSA layers; and
   generating a feed-forward network (FFN) loss based on a difference between the first set of weights and the second set of weights that correspond to FFN layers.

8. The method of claim 7, wherein adjusting at least the second set of weights further comprises generating a pre-training loss based on a combination of the MSA loss, the FFN loss, an a bounding box detection loss for all objects in a language query.

9. A method of performing image processing by a neural network model, the method comprising:
   obtaining a video and a text query for searching an object in the video;
   inputting the video to a vision transformer of the neural network model;
   inputting the text query to a text transformer of the neural network model; and
   identifying the object from the video based on an output of the neural network model,
   wherein the neural network model is trained such that a second set of weights of the text transformer is adjusted based on minimizing a weight difference between a first set of weights of the vision transformer and the second set of weights of the text transformer, the first set of weights of the vision transformer is replaced with the adjusted second set of weights, and the vision transformer is updated based on the adjusted second set of weights.

10. The method of claim 9, further comprising:
    receiving a user's voice input or a user's text input; and
    converting the user's voice input or the user's text input to the text query.

11. The method of claim 9, further comprising:
    displaying an indicator to be overlaid on the object that is identified from the video as corresponding to the text query.

12. The method of claim 9, wherein the text transformer and the vision transformer comprise an identical structure.

13. A system for training a model, the system comprising:
    a memory storing instructions; and
    a processor configured to execute the instructions to:
       configure a first transformer for visual learning with a first set of weights;

configure a second transformer for textual learning with a second set of weights;

adjust at least the second set of weights based on minimizing a weight difference between the first set of weights and the second set of weights;

replace the first set of weights for the first transformer with the adjusted second set of weights; and update the first transformer based on the adjusted second set of weights.

14. The system of claim 13, wherein the first transformer and the second transformer comprise an identical architecture.

15. The system of claim 13, wherein the first transformer comprises a first multi-head self-attention (MSA) layer, and wherein the second transformer comprises a second MSA layer.

16. The system of claim 15, wherein the first set of weights comprises at least one of a first query weight, a first key weight, a first value weight, and a first projection weight, and wherein the second set of weights comprises at least one of a second query weight, a second key weight, a second value weight, and a second projection weight.

17. The system of claim 13, wherein the first transformer comprises a first feed forward network (FFN) layer, and wherein the second transformer comprises a second FFN layer.

18. The system of claim 17, wherein the first set of weights comprises at least one of a first expansion weight and a first compression weight, and wherein the second set of weights comprises at least one of a second expansion weight and a second compression weight.

19. The system of claim 13, wherein the processor is configured to execute the instructions to adjust at least the second set of weights by:

generating a multi-head self-attention (MSA) loss based on a difference between the first set of weights and the second set of weights that correspond to MSA layers; and generating a feed-forward network (FFN) loss based on a difference between the first set of weights and the second set of weights that correspond to FFN layers.

20. The system of claim 19, wherein the processor is further configured to execute the instructions to adjust at least the second set of weights further comprises generating a pre-training loss based on a combination of the MSA loss, the FFN loss, an a bounding box detection loss for all objects in a language query.

* * * * *